(12) United States Patent
Tanaka et al.

(10) Patent No.: US 9,255,604 B2
(45) Date of Patent: Feb. 9, 2016

(54) HYDRO DYNAMIC BEARING DEVICE

(71) Applicant: Mitsubishi Hitachi Power Systems, Ltd., Yokohama-shi, Kanagawa (JP)

(72) Inventors: Takayasu Tanaka, Yokohama (JP); Kenichi Hattori, Yokohama (JP); Yukihiro Yamamoto, Yokohama (JP); Kenichi Tomita, Yokohama (JP); Kengo Iwashige, Yokohama (JP); Kenichi Tohrisawa, Yokohama (JP); Yasunori Shigenaga, Yokohama (JP); Tomoaki Yamashita, Tokyo (JP); Makoto Hemmi, Tokyo (JP); Tateki Nakamura, Yokohama (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 0 days.

(21) Appl. No.: 14/326,180

(22) Filed: Jul. 8, 2014

(65) Prior Publication Data
US 2015/0016760 A1    Jan. 15, 2015

(30) Foreign Application Priority Data

Jul. 9, 2013    (JP) .................................. 2013-143267

(51) Int. Cl.
| | |
|---|---|
| F16C 32/06 | (2006.01) |
| F16C 29/02 | (2006.01) |
| F16C 33/08 | (2006.01) |
| F16C 33/04 | (2006.01) |
| F16C 17/02 | (2006.01) |

(52) U.S. Cl.
CPC .............. *F16C 32/064* (2013.01); *F16C 17/022* (2013.01); *F16C 33/046* (2013.01)

(58) Field of Classification Search
CPC ...... F16C 17/022; F16C 32/06; F16C 33/046; F16C 33/1045; F16C 33/1065; F16C 33/125
USPC ............. 384/42, 93, 100, 120, 123, 129, 273, 384/276, 286, 432, 434
See application file for complete search history.

(56) References Cited

U.S. PATENT DOCUMENTS 2,992,809 A * 7/1961 Herbage ........................ 415/131
3,294,457 A * 12/1966 Johnson ........................ 384/404

(Continued)

FOREIGN PATENT DOCUMENTS

| | | | | |
|---|---|---|---|---|
| GB | 2020783 A | * 11/1979 | ................ | F16C 5/00 |
| JP | 50-54746 A | 5/1975 | | |
| JP | 62-67325 A | 3/1987 | | |

(Continued)

OTHER PUBLICATIONS

Translation of JP 2000-145781.*

(Continued)

*Primary Examiner* — Marcus Charles
(74) *Attorney, Agent, or Firm* — Crowell & Moring LLP

(57) ABSTRACT

A hydro dynamic bearing device comprising an upper half of a main bearing and a lower half of the main bearing, wherein the upper half of the main bearing is lined with a low-strength metal such as a Babbitt metal, wherein a circumferential groove is formed in the lower half of the main bearing, and wherein the low-strength metal of the upper half of the main bearing, which is formed at a region opposed to a downstream side of the circumferential groove formed in the lower half of the main bearing, is partially removed to cause a high-strength bearing base metal to be partially exposed.

3 Claims, 3 Drawing Sheets

(56) References Cited

U.S. PATENT DOCUMENTS

| 4,734,009 | A | * | 3/1988 | Campbell et al. | ............ 384/273 |
| 2006/0140525 | A1 | * | 6/2006 | Giberson | ...................... 384/428 |

FOREIGN PATENT DOCUMENTS

| JP | 8-93769 | A | | 4/1996 | | |
| JP | 09126227 | A | * | 5/1997 | ............. | F16C 17/02 |
| JP | 09273555 | A | * | 10/1997 | ............. | F16C 33/10 |
| JP | 2000145781 | A | * | 5/2000 | ............. | F16C 33/10 |
| JP | 2004092878 | A | * | 3/2004 | ............. | F16C 37/00 |
| JP | 2010116953 | A | * | 5/2010 | | |
| JP | 2013-104546 | A | | 5/2013 | | |

OTHER PUBLICATIONS

Translation of JP 8-93769.*
Extended European Search Report dated Nov. 18, 2014 (four (4) pages).

* cited by examiner

HYDRO DYNAMIC BEARING DEVICE

CLAIM OF PRIORITY

The present application claims priority from Japanese Patent application serial no. 2013-143267, filed on Jul. 9, 2013, the content of which is hereby incorporated by reference into this application.

TECHNICAL FIELD

The present invention relates to a hydro dynamic bearing device and, particularly, to a hydro dynamic bearing device suitable for a large sized drive machine or rotary electric machine.

BACKGROUND ART

A rotary shaft of a drive machine such as a turbine, or of a rotary electric machine such as a turbine generator is supported by hydro dynamic bearing devices (journal bearing devices). In recent years, in order to comply with demands for electric power in, for example, developing countries, the capacity of powertrains (a couple of turbine and generator) alone tends to be increased. According to this, the width or diameter of the bearing device supporting the rotary shaft also tends to be increased.

In the hydro dynamic bearing device that is used in the turbine or turbine generator, a bearing surface of a lower half of a main bearing is formed with a groove at the center of a bearing width and in a circumferential direction (for example, JP-A No. Hei 8-93769). In a case where the circumferential groove is not provided, along with an increase in the bearing width, a pressure receiving area of the shaft is increased to increase force that lifts the shaft up, and stability of the bearing tends to be lost. However, by the provision of the circumferential groove at the center of the bearing width, formation of a fluid film of lubricant oil is stimulated and the stability of the bearing can be maintained.

Moreover, JP-A No. Sho 62-67325 (Patent Literature 2) describes that, in a journal bearing used in a steam turbine or the like, in order to prevent a bearing inner circumferential surface from being eroded by vapour bubbles produced in lubricant oil, an inner circumferential surface of an upper half part of a bearing body is, for example, heat-treated to thereby enhance a surface hardness and homogenize a structure, or a hardened layer is formed on the inner circumferential surface of the upper half part of the bearing body by plating or the like.

CITATION LIST

Patent Literature

[Patent Literature 1] JP-A No. Hei 8-93769
[Patent Literature 2] JP-A No. Sho 62-67325

SUMMARY OF INVENTION

Technical Problem

According to the increase of the bearing diameter, a peripheral speed of the shaft is increased. For example, in a case where a shaft diameter is 550 mm and operation is carried out at 60 Hz, the peripheral speed exceeds 100 m/sec. By such an increase in the peripheral speed of the shaft, a velocity of the flow of the lubricant oil between the shaft and the bearing surface is also increased and, moreover, generation of a cavitation area between the shaft and the bearing surface is brought about. A discontinuous portion is formed on the inner circumference of the bearing surface due to an oil supply groove, an oil drain groove, etc. In this discontinuous portion, particularly by an increase in the velocity of the flow of the lubricant oil in the circumferential groove, erosion due to collision of the lubricant oil and cavitation erosion may be produced.

Particularly in a case of a large sized drive machine or rotary electric machine, in order to protect a shaft, an entire inner circumference of a bearing is subjected to lining treatment using a low-strength metal (Babbitt metal (white metal)) softer than a material for the shaft (steel). This low-strength metal is susceptible to erosion due to the collision of the lubricant oil and cavitation erosion.

In the Patent Literature 2, in order to prevent the bearing inner circumferential surface from being eroded by the cavitation, the hardened layer is formed on the entire inner circumferential surface of the upper half part of the bearing body by the heat-treatment, plating, etc. However, in order to protect the shaft, it is preferable to provide a metal such as a Babbitt metal on the bearing surface of the upper half of the main bearing.

The object of the present invention is to provide a hydro dynamic bearing device in which a bearing surface of an upper half of a main bearing is also lined with a low-strength metal such as a Babbitt metal and in which even if a bearing diameter is increased, erosion by lubricant oil and cavitation erosion can be suppressed.

Solution to Problem

A hydro dynamic bearing device according to the present invention comprising: an upper half of a main bearing and a lower half of the main bearing, wherein the upper half of the main bearing is lined with a low-strength metal, wherein a circumferential groove is formed in the lower half of the main bearing, and wherein the low-strength metal of the upper half of the main bearing, which is formed at a region opposed to a downstream side of the circumferential groove formed in the lower half of the main bearing, is partially removed to cause a high-strength bearing base metal to be partially exposed.

Advantageous Effects of Invention

According to the present invention, in the hydro dynamic bearing device in which the bearing surface of the upper half of the main bearing is also lined with the low-strength metal such as a Babbitt metal and, even if the bearing diameter is increased, it is possible to suppress the erosion by the lubricant oil and the cavitation erosion.

Other problems, constitution, and effects will become apparent from the following description of an embodiment.

DESCRIPTION OF EMBODIMENTS

An embodiment of the present invention will be explained hereinafter with reference to the drawings.

Figure 1:
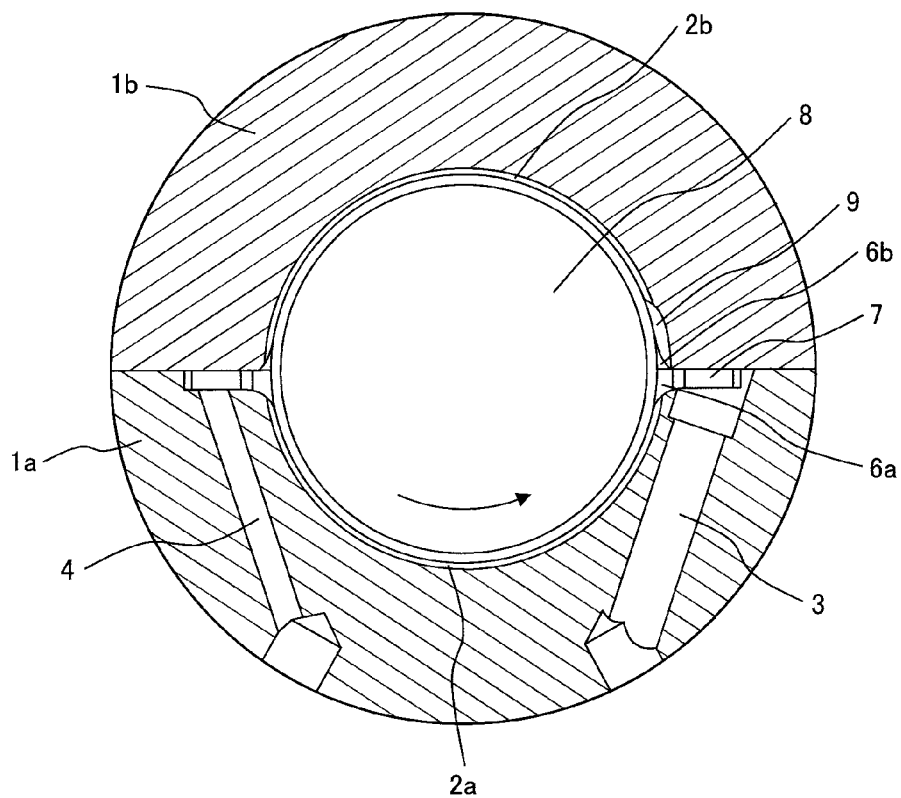
FIG. 1 is a sectional view of a hydro dynamic bearing device of an embodiment of the present invention at the center of a bearing width.

As shown in FIG. 1, a hydro dynamic bearing device of this embodiment is divided vertically into two, namely, an upper half 1b of a main bearing and a lower half 1a of the main bearing. Each of the upper half 1b of the main bearing and the lower half 1a of the main bearing has a bearing base metal whose inner circumferential surface, namely, entire circumferential bearing surface, is lined with a metal (a Babbitt metal or the like) of about a few millimeters having strength lower than the bearing base metal. Moreover, as necessary, a liner is provided on the inner circumferential surface of the bearing base metal. In this case, a low-strength metal is lined on the liner.

The hydro dynamic bearing device of this embodiment is provided, at the loaded lower half 1a of the main bearing, with an oil supply path 3 for supplying lubricant oil and an oil drain path 4 for draining a portion of the lubricant oil. The lubricant oil supplied from the oil supply path 3 flows into circumferential grooves 2a, 2b that are formed in the bearing surface, namely, the inner circumferential surface of the low-strength metal. Then, the lubricant oil from the circumferential grooves 2a, 2b is supplied between the bearing surface and a shaft 8 and a fluid film is formed. Thereby, the rotary shaft 8 is rotatably supported, via the fluid film, by the upper half 1b of the main bearing and the lower half 1a of the main bearing.

Figure 2:
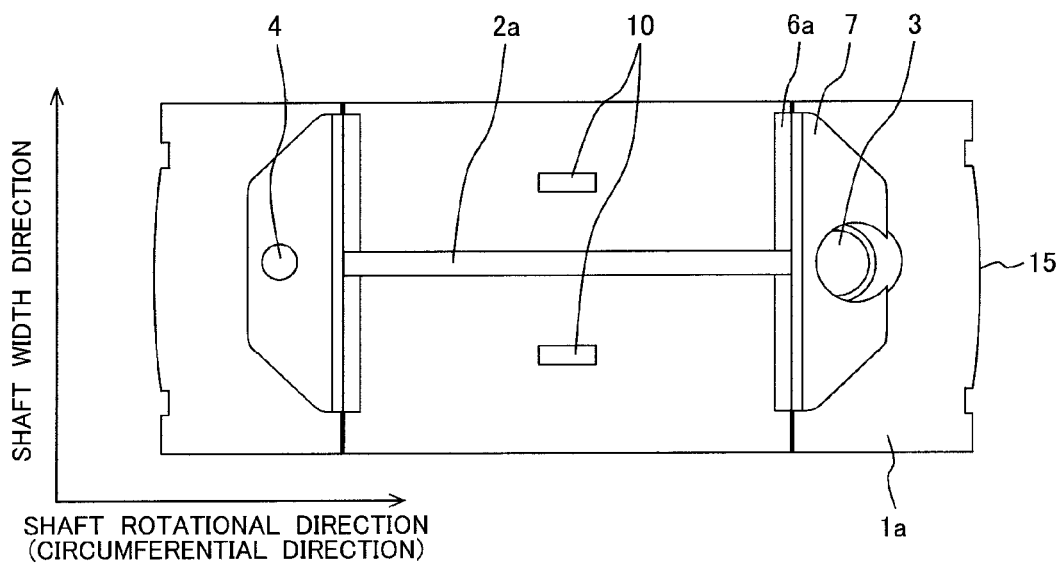
FIG. 2 is a top plane view of a lower half of a main bearing of the hydro dynamic bearing device according to the embodiment of the present invention.
Figure 4:
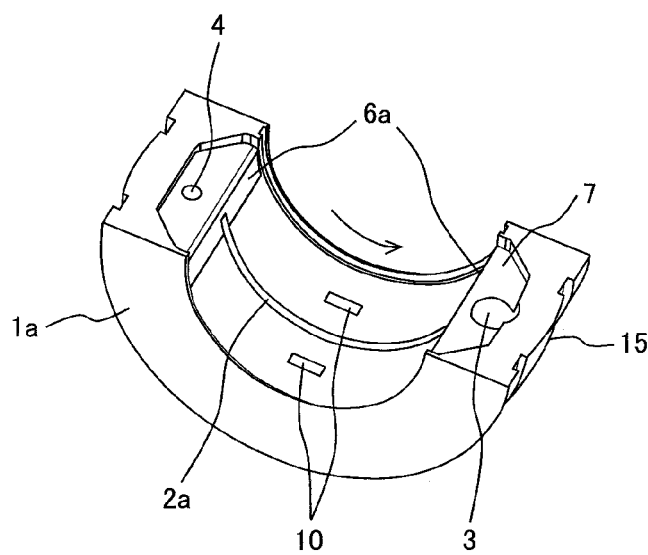
FIG. 4 is a perspective view of the lower half of the main bearing of the hydro dynamic bearing device according to the embodiment of the present invention.

As shown in FIGS. 2 and 4, the lower half 1a of the main bearing is provided with horizontal space portions 7 on the oil supply path 3 side and the oil drain path 4 side in the vicinity of a mating surface of the lower half 1a of the main bearing relative to the upper half 1b of the main bearing. Moreover, wide-width (substantially entire width of the bearing) oil supply/drain grooves 6a that continuously connect the horizontal space portions 7 and the bearing surface of the lower half 1a of the main bearing are formed. Moreover, at the center of an axial direction of the lower half 1a of the main bearing, a circumferential groove 2a for ensuring vibration-stability of the rotary shaft 8 is provided along a rotational direction. Moreover, the bearing surface of the lower half 1a of the main bearing is formed, at a lowermost part thereof, with oil supply holes 10 on the both sides of the circumferential groove 2a. At the time of startup of the drive machine or rotary electric machine, the lubricant oil is supplied from these oil supply holes 10 to lift up the rotary shaft 8 and prevents the rotary shaft 8 from being rotated from a state where the shaft 8 and the bearing surface of the lower half 1a of the main bearing adhere together.

Figure 3:
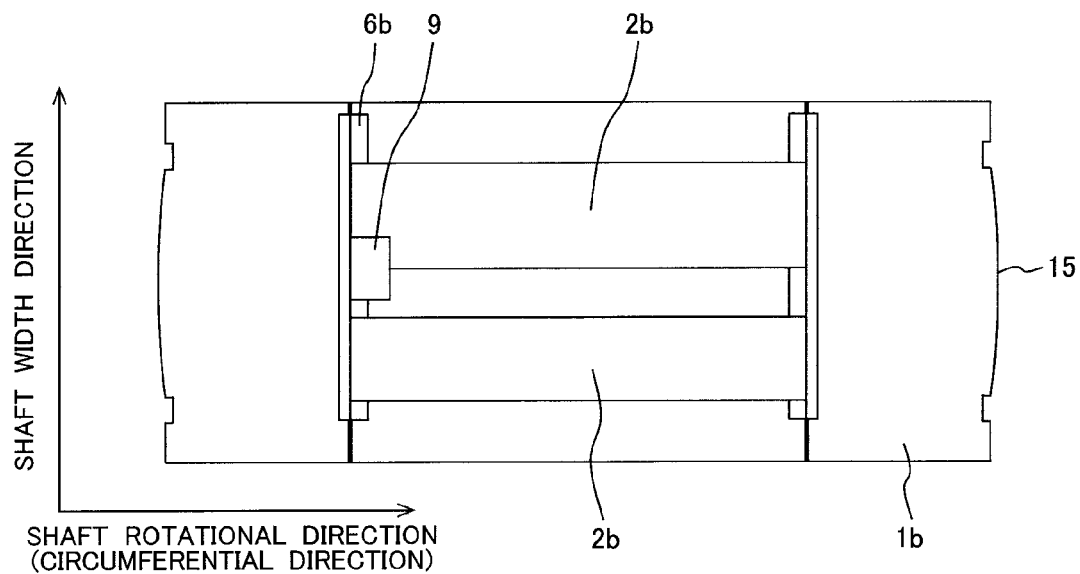
FIG. 3 is a top plane view of an upper half of the main bearing of the hydro dynamic bearing device according to the embodiment of the present invention (a top plane view of the upper half of the main bearing at the time when a surface of the upper half of the main bearing which is opposed to the lower half of the main bearing is faced upward)
Figure 5:
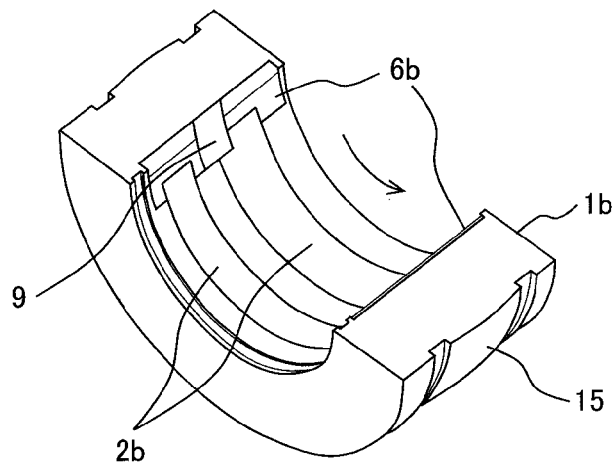
FIG. 5 is a perspective view of the upper half of the main bearing of the hydro dynamic bearing device according to the embodiment of the present invention (a perspective view of the upper half of the main bearing at the time when the surface of the upper half which is opposed to the lower half of the main bearing is faced upward)

As shown in FIGS. 3 and 5, the upper half 1b of the main bearing is formed with two wide-width circumferential grooves 2b. In lieu of these circumferential grooves 2b, one wide-width circumferential groove may be employed. Moreover, the upper half 1b of the main bearing is provided with wide-width (substantially entire width of the bearing) oil supply/drain grooves 6b that are formed so as to gently extend to the bearing surface of the upper half 1b of the main bearing from a mating surface of the upper half 1b of the main bearing relative to the lower half 1a of the main bearing. Moreover, an upstream side of the upper half 1b of the main bearing which is mated with a downstream side (a side at which the oil supply path 3 is provided) of the lower half 1a of the main bearing is provided, at a region of the upstream side which is opposed to the circumferential groove 2a of the lower half 1a of the main bearing, with a notch portion 9 that is formed by cutting out a low-strength metal of the region. The details are explained with reference to FIG. 6.

As shown in FIGS. 2 to 5, each of the outer circumferential surfaces of the upper half 1b of the main bearing and lower half 1a of the main bearing is formed in a spherical shape 15 and is provided with a spherical seat (abbreviated in the drawings).

Erosion by the lubricant oil and cavitation erosion are produced mainly at a discontinuous part of a portion extending to the upper half 1b of the main bearing from the lower half 1a of the main bearing. Particularly, they are produced at an opposed area of the upper half 1b of the main bearing which is located on an outlet side of the circumferential groove 2a of the lower half 1a of the main bearing. Thus, in this embodiment, a position at which the erosion by the lubricant oil and the cavitation erosion are produced is confirmed by test or the like and, in addition to the erosion-produced region, the low-strength metal lined on the bearing surface of the upper half 1b of the main bearing is previously removed partially.

Figure 6:
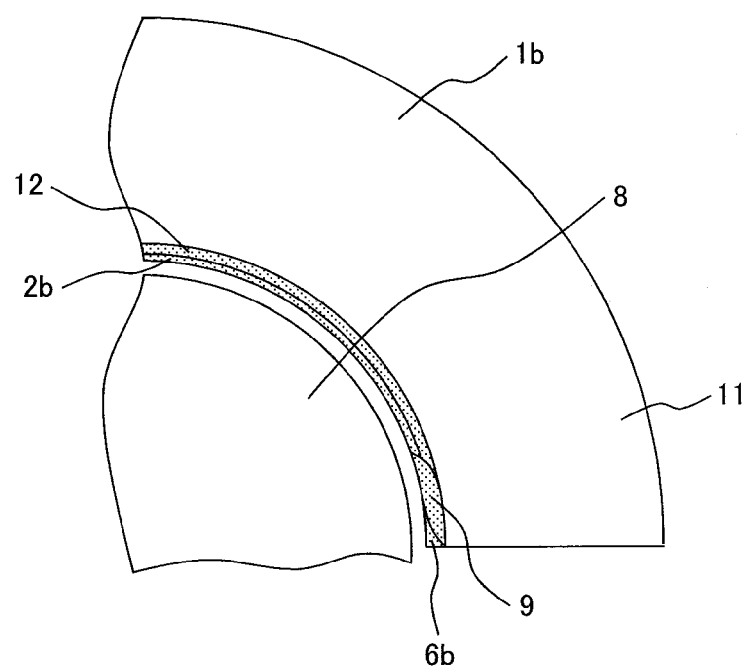
FIG. 6 is a partially enlarged sectional view of the upper half of the main bearing of the hydro dynamic bearing device according to the embodiment of the present invention.

Namely, as shown in FIG. 6, the upper half 1b of the main bearing has a low-strength metal 12 lined on the inner circumferential surface of a bearing base metal 11 thereof. Incidentally, in FIG. 6, section hatching of the bearing base metal 11 is omitted. The circumferential grooves 2b are provided in the inner circumferential surface of this low-strength metal. As shown in FIGS. 3, 5, and 6, the low-strength metal 12 at an inlet region of the upper half 1b of the main bearing that is opposed to the outlet of the circumferential groove 2a of the lower half 1a of the main bearing is previously notched partially, whereby the notch portion 9 is formed. By previously providing the notch portion 9 in this way, the bearing base metal (base metal made of steel, stainless steel, or high-carbon chromium steel) that has strength higher than the low-strength metal is made partially exposed. Therefore, in this notch portion 9, an effect equivalent to an effect that a shield is formed of a partially high-strength metal is obtained.

Therefore, even in the state where the low-strength metal is lined on the substantially entire circumference of the bearing surface, it is possible to suppress the erosion of the upper half 1b of the main bearing by the lubricant oil and the damage of the upper half 1b of the main bearing by the cavitation erosion and to prolong the life-time of the bearing. In a case where the notch portion 9 is not provided, it is conceivable that, after prolonged operation, the bearing base metal 11 is exposed due to the erosion by the lubricant oil and the damage by the cavitation erosion, in the same manner as in the case of forming the notch portion 9. However, by previously forming the notch portion 9 as in this embodiment, it is possible to previously prevent any foreign material from entering between the bearing surface and the shaft by peeling and shaving of the low-strength metal during operation.

Incidentally, while the low-strength metal is partially removed to cause the high-strength bearing base metal to be exposed in the above-mentioned embodiment, the low-strength metal is partially removed and the region in which the low-strength metal is partially removed may be shielded by a high-strength metal (for example, a metal higher in strength of material by a few times).

Incidentally, the present invention is not limited to the above-mentioned embodiment and includes various modifications. For example, the above-mentioned embodiment has been explained in details in order to facilitate understanding of the present invention and is not always limited to an embodiment including all the elements that have been explained. Moreover, it is possible to replace a portion of a structure of a certain embodiment with a structure of another embodiment and it is possible to add a structure of a certain embodiment to a structure of another embodiment. Moreover, it is possible to add a structure of a certain embodiment to a portion of a structure of another embodiment, delete the portion of the structure of the embodiment, and replace the portion of the structure of the embodiment with a structure of another embodiment.

REFERENCE SIGNS LIST

1a: Lower half of main bearing
1b: Upper half of main bearing
2a, 2b: Circumferential groove
3: Oil supply path
4: Oil drain path
6a, 6b: Oil supply/drain groove
7: Horizontal space portion
8: Rotary shaft
9: Notch portion
10: Oil supply hole
11: Bearing base metal
12: Low-strength metal

The invention claimed is:

1. A hydro dynamic bearing device comprising:
an upper half of a main bearing; and
a lower half of the main bearing, wherein
   the upper half of the main bearing and the lower half of the main bearing are respectively provided with a low-strength metal formed on an inner circumferential side of a bearing base metal thereof,
   the lower half of the main bearing has an oil supply port opening in a mating surface of the lower half of the main bearing relative to the upper half of the main bearing on a downstream side, and a circumferential lubrication groove provided at a center of a bearing width direction and in a circumferential direction,
   the low-strength metal of the upper half of the main bearing, which is located at a region opposed to a downstream side outlet of the circumferential lubrication groove of the lower half of the main bearing, is partially removed to cause the bearing base metal to be partially exposed and
   the upper half of the main bearing is provided with a wide-width oil supply/drain groove formed so as to gently extend to the bearing surface of the upper half of the main bearing from a mating surface of the upper half of the main bearing relative to the lower half of the main bearing.

2. A hydro dynamic bearing device comprising:
an upper half of a main bearing; and
a lower half of the main bearing, wherein
   the upper half of the main bearing and the lower half of the main bearing are respectively provided with a low-strength metal formed on an inner circumferential side of a bearing base metal thereof,
   the lower half of the main bearing has an oil supply port opening in a mating surface of the lower half of the main bearing relative to the upper half of the main bearing on a downstream side, and a circumferential lubrication groove provided at a center of a bearing width direction and in a circumferential direction,
   the low-strength metal of the upper half of the main bearing, which is located at a region opposed to a downstream side outlet of the circumferential lubrication groove of the lower half of the main bearing, is partially removed to cause the bearing base metal to be partially exposed and
   a metal shield that has strength higher than the low-strength metal is formed at the part of the upper half of the main bearing at which the low-strength metal is partially removed.

3. A hydro dynamic bearing device comprising: an upper half of a main bearing; and a lower half of the main bearing,
   wherein the upper half of the main bearing and the lower half of the main bearing are respectively provided with a low-strength metal formed on an inner circumferential side of a bearing base metal thereof,
   the lower half of the main bearing has an oil supply port opening in a mating surface of the lower half of the main bearing relative to the upper half of the main bearing on a downstream side, and a circumferential lubrication groove provided at a center of a bearing width direction and in a circumferential direction, and
   the upper half of the main bearing has a notch at a region opposed to a downstream side outlet of the circumferential lubrication groove of the lower half of the main bearing, the notch being configured to cause the bearing base metal to be partially exposed.

* * * * *